July 8, 1969 R. J. GIANNAMORE 3,454,834

TRANSIENT SUPPRESSION SWITCH

Filed Oct. 25, 1966 Sheet 1 of 3

INVENTOR
RONALD J. GIANNAMORE
BY Fishman & Van Kirk
ATTORNEYS

July 8, 1969 R. J. GIANNAMORE 3,454,834

TRANSIENT SUPPRESSION SWITCH

Filed Oct. 25, 1966 Sheet 3 of 3

United States Patent Office 3,454,834

Patented July 8, 1969

3,454,834

TRANSIENT SUPPRESSION SWITCH

Ronald J. Giannamore, Wapping, Conn., assignor to United Aircraft Corporation, East Hartford, Conn., a corporation of Delaware Filed Oct. 25, 1966, Ser. No. 589,343
Int. Cl. H02h 3/28, 7/00, 3/22
U.S. Cl. 317—31 14 Claims

ABSTRACT OF THE DISCLOSURE

An electronic switch characterized by high current carrying capability and rapid response, the switch being particularly well suited for employment as a transient suppressor. The switch employs a first normally conductive controlled rectifier connected in series with a load and a second normally nonconductive controlled rectifier connected in parallel with the direct current source. The first rectifier device is force commutated by the switching of the second rectifier device. The normally nonconductive rectifier device is self-commutating and is turned on in response to the appearance of transients at the source output.

The present invention relates to electronic switches. More particularly, the present invention is directed to electronic switches characterized by high current carrying capability and rapid response. Accordingly, the general objects of the present invention are to provide new and improved apparatus of such character.

While not limited thereto in its utility, the present invention is particularly well suited for employment as a transient suppressor. That is, the present invention has been found to be an especially desirable device for removing the power to a load at the onset of a transient in the supply voltage. The occurrence of short duration, relatively large magnitude voltage pulses, hereinafter called transients, has long plagued designers of electrical and electronic equipment. Voltage transients may be associated with deliberately caused conditions such as switching or they may be caused by spontaneous phenomena such as capacitor sparking, random line disturbances or hole storage recovery phenomena in semiconductor devices. Transients will, of course, often have an adverse effect on the load to which they are delivered. These adverse effects include the destruction of sensitive instruments and semiconductor devices and the confusing or erasing of a computer memory.

Accordingly, the necessity of providing for the suppression of transients is a design criteria imposed upon many types of electronic equipment. When solid state devices are employed in such equipment, provision for transient suppression becomes highly desirable and often essential. This is in part due to the fact that semiconductor devices have lower voltage handling capabilities than the devices they are replacing and thus they are usually operated at a level which provides little margin between the operating voltage and the voltage level at which the devices will be damaged. In the past, numerous methods of suppressing transients have been employed. All of these prior art methods have serious inherent deficiencies. The most common of these deficiencies is an inability to handle high power levels and still respond to the occurrence of a transient rapidly enough to prevent damage to the equipment to be protected. Examples of the prior art transient suppression schemes include, in high voltage circuits, spark gaps and electro-mechanical relay devices. In the case of inductive loads, special diode protection circuits have been designed to suppress transients. These protection circuits may, for example, comprise diode bridges employing controlled avalanche rectifiers and selenium diodes having the characteristics of a "Zener" diode. As noted above, these prior art devices have not proved to be a solution to the problem of disconnecting a load from the line immediately upon the initiation of a voltage transient while providing a path for the delivery of relatively large amounts of power to the load at other times.

Due to its ability to be rapidly switched from one conductive state to another and to withstand relatively high currents, the silicon controlled rectifier (SCR) is finding ever increasing use in switching circuits. In the power supply arts, for example, in the field of static inverters and converters, SCRs are often used to connect and disconnect a current source from a load such as the primary winding of an output transformer. Since SCRs switch from one conductive state to another in a matter of microseconds, they may be used for suppressing transient voltages with a much higher rate of rise than could be safely handled by most prior art devices.

The present invention comprises a novel electronic switch which employs SCRs and which is particularly well suited for disconnecting a load from a source of direct current upon the occurrence of a transient. The present invention employs an inductor and normally conductive SCR connected in series between a first terminal of the source and the load. Connected in parallel with a portion of the inductor, the normally conductive SCR and the load is a second, normally nonconductive SCR. The circuit of the present invention is particularly unique in that, in contradistinction to the common practice in the prior art, the cathode of each of the SCRs is connected to the other terminal of the direct current source through a separate commutating capacitor. This unique arrangement of the SCRs, inductor and commutating capacitors results in the SCR in series with the load being force commutated while the other SCR is self-commutating.

The present invention also comprises a voltage sensor, control circuit and means for gating the two SCRs on. When the voltage sensor sees the beginning of a transient, it provides an input to the control circuit which in turn delivers a control signal to the gating circuit. The gating circuit delivers the control signal to the normally nonconducting SCR which causes this device to become highly conductive in a matter of microseconds. Turning on of the normally nonconductive SCR causes the SCR in series with the load to be switched off (force commutated) thus disconnecting the load from the source. This switching action occurs almost instantaneously and, due in part to the lag imparted to the transient by the time constant of the LC circuit comprising the series inductor and commutating capacitors, before the transient can reach the load.

Also in contradistinction to the prior art, the present invention will turn the series connected SCR back on when the line voltage reaches the proper level should it be turned off for any reason other than the sensing of the condition it is desired to suppress. For example, in the prior art with a capacitive load, the commutating network would turn the series connected SCR off each time it was turned on. Further, the present invention, due to its novel starting circuit, minimizes radio frequency interference (RFI) since the series connected SCR is turned on and off only in response to the occurrence of transients or other sensed condition; the circuit otherwise operating under steady state conditions.

It is therefore an object of the present invention to provide an electronic switch.

It is another object of the present invention to provide an electronic switch capable of safely handling relatively high currents.

It is also an object of the present invention to provide an electronic switch characterized by rapid response.

It is a further object of the present invention to provide an electronic switch capable of handling relatively high currents and characterized by rapid response.

It is yet another object of the present invention to provide an electronic switch employing controlled rectifier devices.

It is still another object of the present invention to provide an electronic switch employing solid state controlled rectifier devices.

It is a further object of the present invention to provide an electronic switch employing at least a first pair of silicon controlled rectifiers, each of said silicon controlled rectifiers having a separate commutating capacitor.

It is also an object of the present invention to suppress transients.

It is a still further object of the present invention to disconnect a load from a current source when the source voltage rises above a preset level.

It is yet another object of the present invention to provide a circuit employing controlled solid state rectifiers which will disconnect a load from a current source upon the occurrence of a transient.

It is still another object of the present invention to provide a circuit employing controlled rectifiers which may be used to disconnect a load from a direct current source upon the occurrence of a transient.

It is another object of the present invention to provide a transient suppressor characterized by rapid response and minimized radio frequency interference generation.

A preferred embodiment of the means by which the foregoing and other objects of the present invention may be accomplished is shown in the accompanying drawing. The present invention will be clearly understood and its various advantages will become apparent to those skilled in the art by reference to the drawing, wherein like reference numerals refer to like elements in the various figures and in which.

Figure 1:
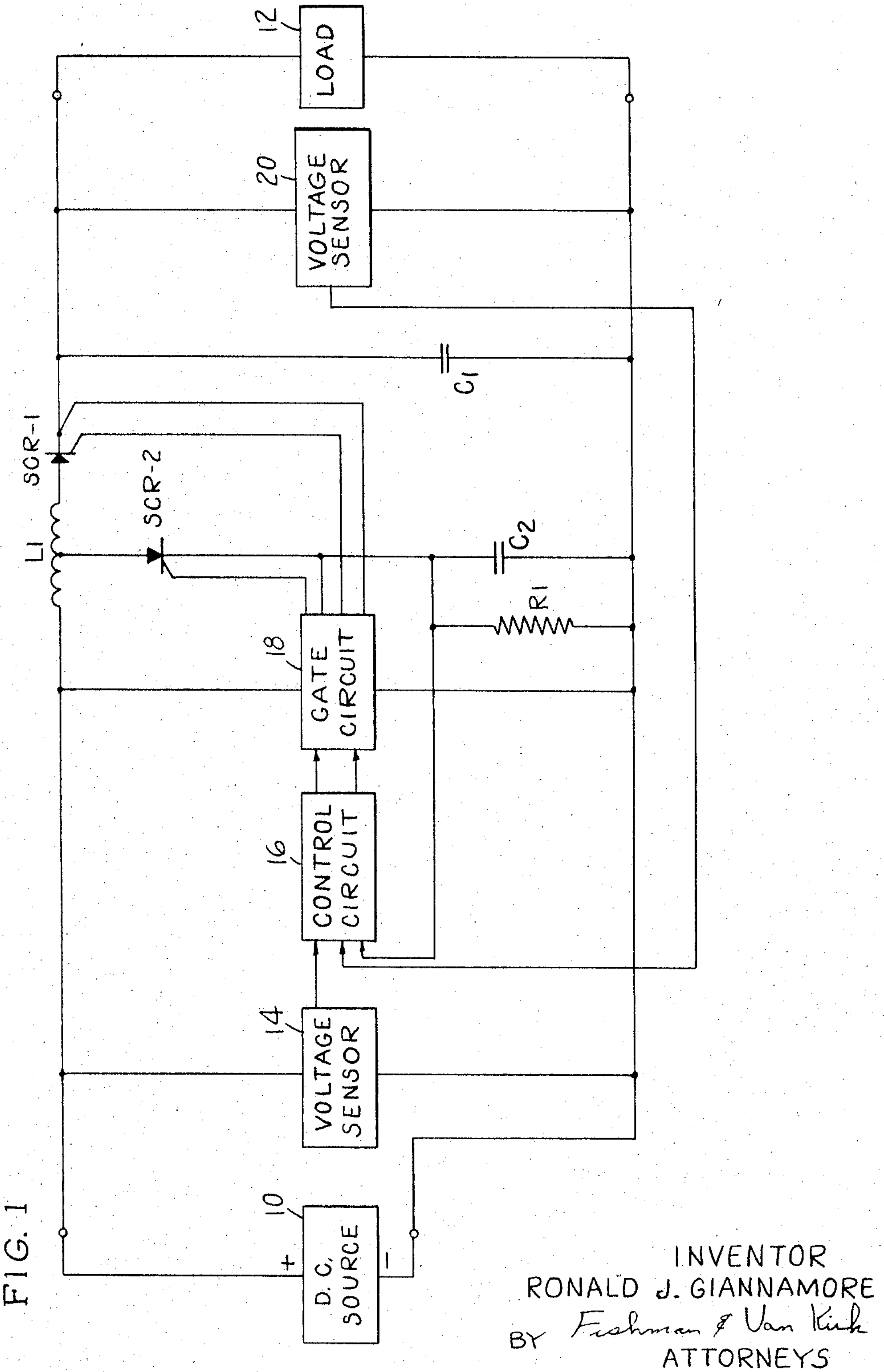
FIGURE 1 is a block diagram of a preferred embodiment of the present invention.

Referring now to FIGURE 1, a direct current source 10 supplies power for a load 12 which may, for example, be a solid state static inverter employing semiconductor devices such as transistors. As noted above, semiconductor devices are usually operated at a level which provides little margin of safety and thus means must be provided to disconnect load 12 from source 10 upon the occurrence of a transient. As shown in FIGURE 1, this means comprises, in part, a tapped inductor L1 and a normally conductive silicon controlled rectifier SCR–1. Inductors L1 and SCR–1 are connected in series between the positive terminal of source 10 and load 12. Under normal conditions, current from source 10 flows through inductor L1 and silicon controlled rectifier SCR–1 to load 12.

Connected between a tap, usually the center tap, on conductor L1 and the negative terminal of source 10 via a resistor R1 is a second, normally nonconductive controlled rectifier device SCR–2. Connected in parallel with resistor R1, between the cathode of SCR–2 and the negative terminal of source 10, is a commutating capacitor C2. Similarly, connected between the cathode of SCR–1 and the negative terminal of source 10, and in parallel with load 12, is a second commutating capacitor C1.

The control means for controlled rectifier devices SCR–1 and SCR–2 comprises a voltage sensor 14, control circuit 16, gate circuit 18 and a second voltage sensor 20. Voltage sensor 14 is connected across the terminals of source 10. As will be described in more detail below in connection with the explanation of FIGURE 2, voltage sensor 14 includes means for providing input signals to control circuit 16 which will, through operation of the control and gate circuits, cause SCR–1 to be turned either on or off depending on the level of the source voltage. Considering the case of a positive going transient, when the line voltage begins to exceed a preselected level thus indicating the onset of a transient, voltage sensor 14 will supply a signal to control circuit 16. Control circuit 16, in a manner also to be described below in greater detail, in turn delivers a gating control signal to gate circuit 18. Gate circuit 18 has two pair of output terminals which are respectively connected between the control electrode and cathode of SCR–1 and SCR–2. When gate circuit 18 receives a gating control signal initiated by an output from voltage sensor 14, it forward biases SCR–2 which then switches on and becomes highly conductive. The switching on of SCR–2 clamps the center tap of inductor L1 to ground (the negative terminal of source 10) through commutating capacitor C2. Accordingly, the end of inductor L1 which is connected to the anode of SCR–1 will, due to transformer action, be driven to a value of minus the instantaneous input voltage. The values of L1 and commutating capacitors C1 and C2 are selected to keep the anode of SCR–1 negative for a period sufficient to shut SCR–1 off (greater than the turn off time of the device). Prior to the initiation of a transient, commutating capacitor C1 will have been charged up to the input voltage. Thus, when the center tap of L1 is clamped to the negative terminal of source 10, the cathode of SCR–1 will be held at the input voltage and thus an extinguishing voltage of twice the line voltage will appear across SCR–1 and the controlled rectifier device will be force commutated. The shut off time of SCR–1 is determined by the LC time constant of inductor L1 and commutating capacitor C2 and the discharge time of commutating capacitor C1. Since in any circuit employing silicon controlled rectifiers the commutating capacitors are relatively costly items and further since the physical size and cost of these capacitors increases as the value of the capacitors increases, a design criteria in SCR circuits is to achieve the maximum turn off time with the use of the smallest commutating capacitors possible. The present invention, by employing the second commutating capacitor C1, as will be shown below, achieves the above noted desired results and meets the design criteria.

It should be noted that, employing the present invention, the load will never see a transient. That is, as soon as the line or source voltage starts to rise, SCR–2 will be turned on and SCR–1 thereby commutated off thus disconnecting the load. If the transients are not large enough to trip the control circuit, or are of extremely short duration (RFI), then inductor L1 and commutating capacitor C1 will function as a filter circuit to prevent such transients from reaching the load. In other words, the response time of the electronic switch of the present invention is faster than the LC time constant of inductor L1 and commutating capacitor C1. It should also be noted that commutating capacitor C1 also suppresses the shut off spike which is generated when SCR–1 is commutated off.

Referring again to FIGURE 1, it was reported above that a second voltage sensor 20 is connected in parallel with load 12. Voltage sensor 20, at a predetermined load voltage, provides an input signal which is "ORed" with the signal from voltage sensor 14 in control circuit 16. The input signal from sensor 20, through the operation of the control and gating circuits, will cause SCR–1 to be gated on if the load voltage is below a predetermined level. Thus, even if load 12 is highly capacitive and in combination with L1 forms a tuned network which, when in resonance, causes the load voltage to exceed the source voltage and thereby reverse bias SCR–1, SCR–1 will be immediately turned back on when the voltage across the capacitive load falls below the predetermined voltage. Sensor 20 also assures that, should the source be connected to the apparatus comprising the present invention when no load is connected across the output terminals, and further should SCR–1 for any reason be commutated off, it will not be necessary to disconnect and reconnect source 10 in order to turn SCR–1 back on. That is, all components are in a steady state condition except when a transient occurs. Accordingly, only when power is applied or upon the removal of a transient will SCR–1 be gated on. Should SCR–1 be turned off for any reason other than the occurrence of a transient, voltage sensor 20 will provide for the generation of a signal to gate SCR–1 back on. Once SCR–1 conducts, voltage sensor 20 will cease to oscillate. Hence, the circuit is in a steady state condition during normal operation.

Figure 2:
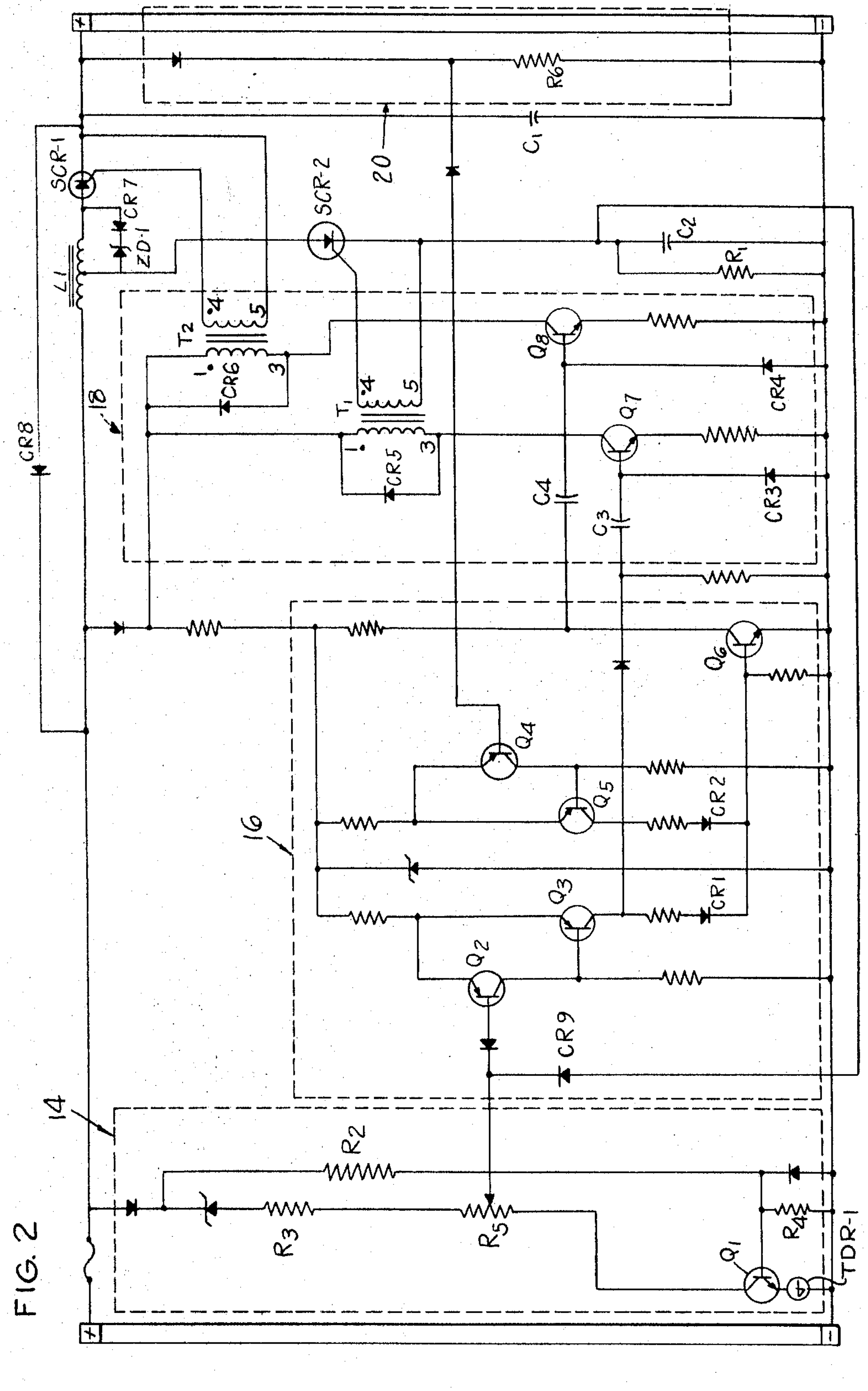
FIGURE 2 is a schematic representation of a preferred embodiment of circuitry corresponding to the block diagram of FIGURE 1.

Referring now to FIGURE 2, circuitry of a preferred embodiment of the invention depicted in block form in FIGURE 1 is shown schematically. In FIGURE 2, each of the main subsystems shown in block form in FIGURE 1 has been enclosed within broken lines and indicated by the same general reference character employed in the description of FIGURE 1. As noted above, voltage sensor 14 provides input signals to control circuit 16 to control both the gating on and gating off of the switch of the present invention. Voltage sensor 14 comprises a bridge circuit which includes resistors R2, R3 and R4, potentiometer R5, transistor Q1 and a semiconductor resistance device TDR1. The semiconductor resistance device TDR1 is a device which functions like a Shockley diode and which may be described broadly as a transistor diode resistor. Q1 and TDR1 combine to form a silicon controlled switch.

Control circuit 16 includes a pair of Schmitt triggers. The first one of these trigger circuits comprises transistors Q2 and Q3 while the second trigger circuit comprises transistors Q4 and Q5. The collector electrodes of transistors Q3 and Q5 are respectively connected to the base electrode of an amplifier Q6 by diodes CR1 and CR2. Diodes CR1 and CR2 form an "OR" gate which functions in the manner to be described below. The input from voltage sensor 14 is applied to the base electrode of transistor Q2 of the first Schmitt trigger. The output of voltage sensor 20 is applied to the base electrode of transistor Q4 of the second Schmitt trigger.

The gating circuit comprises a pair of differential gates which shape and amplify the control signals provided by control circuit 16. The first of these differential gates comprises capacitor C3, diode CR1 and transistor amplifier Q7. The second differential gate comprises capacitor C4, diode CR2 and transistor amplifier Q8. The function of the gates is to differentiate and amplify control pulses generated by control circuit 16. Capacitors C3 and C4 respectively prevent amplifiers Q7 and Q8 from staying on when the control circuit is triggered by a transient. If Q7 and Q8 were allowed to remain on, gating transformers T1 and T2 would saturate. By keeping Q7 and Q8 from switching except when a transient occurs, the need for an RFI filter is obviated. The input to the differential gate comprising transistor Q7 is connected to the collector electrode of transistor Q3 of the first Schmitt trigger in control circuit 16. The input to the differential gate comprising transistor Q8 is connected to the collector electrode of transistor amplifier Q6. Gating circuit 18 also comprises a pair of transformers T1 and T2. The collector current of transistor Q7 will flow through the primary winding of transformer T1. The secondary winding of transformer T1 is connected between the control electrode and cathode of SCR–2. Accordingly, a voltage pulse of the proper polarity generated by the switching of Q7 and delivered through the primary winding of transformer T1 will cause SCR–2 to be gated on. The collector current of transistor Q8 flows through the primary winding of transformer T2. The secondary winding of transformer T2 is connected between the control electrode and the cathode of SCR–1 and thus transformer T2 will gate SCR–1 on when transistor Q8 is switched. Diodes CR5 and CR6 are respectively connected across the primary windings of transformers T1 and T2 and protect transistors Q7 and Q8 by limiting the reverse voltage across T1 and T2 when Q7 and Q8 respectively switch off.

Voltage sensor 20 comprises resistor R6. The voltage drop across resistor R6 is applied as the input signal to transistor Q4. When the voltage across R6 falls below the triggering point of Q4, Q4 will turn on thus turning off Q5. When Q5 turns off, and if Q3 is off, Q6 will be turned off. As will be explained below, turning off of Q6 will pulse on Q8 thus turning SCR–1 on again.

It is also worthy of note that a "Zener" diode ZD1 and a diode CR7 are connected in series between the center tap of inductor L1 and the anode of SCR–1. In this series connection, diode CR7 protects the "Zener" diode ZD1. The two diodes in turn provide protection against damage to SCR–1 by positive spikes during switching off of SCR–1 and thus permit the use of smaller voltage rated and thus less expensive SCRs than would otherwise be needed.

A diode CR8 is connected between the input and output terminals of the present invention as shown. CR8 clamps the output to the input thus insuring that the output voltage never exceeds the input voltage by a large magnitude.

In operation, presuming a voltage source has been connected across the input terminals of the circuit shown schematically in FIGURE 2, TDR1 will break down when the source voltage reaches a predetermined minimum level. The break down of TDR1 will allow current to flow through transistor Q1 thus turning on transistor Q1. Conduction of transistor Q1 will draw base current through transistor Q2 thus turning transistor Q2 on. Since transistors Q2 and Q3 form a Schmitt trigger, turning on of Q2 will cause Q3 to be turned off. The turning off of transistor Q3 will result in transistor Q6 also being turned off. Turning off of transistor Q6 will pulse transistor Q8 on. When transistor Q8 pulses on, current will flow through the primary winding of transformer T2 thus causing a voltage pulse to be applied between the control electrode and cathode of SCR–1 thereby gating SCR–1 on. The circuit is now ready to operate. TDR1 is, of course, normally in a conductive state and remains conductive as long as the source voltage remains above a predetermined level. When a transient or high voltage appears at the input terminals to the present invention, the voltage at the arm of potentiometer R5 rises thereby turning off transistor Q2 and turning on transistor Q3. The turning on of transistor Q3 turns transistors Q6 and Q7 on and transistor Q8 off. Turning on (switching) of transistor Q7 causes current to flow through the primary winding of transformer T1 and a gating pulse to thus be applied between the cathode and control electrode of SCR–2. This pulse turns on SCR–2 and, as noted above, the turning on of SCR–2 will clamp the center tap of conductor L1 to ground thereby causing SCR–1 to be commutated off. SCR–2 is self-commutated by the tuning of L1 and C2.

Once the electronic switch of the present invention has been opened thus preventing the transient from reaching the load, and the transient has been dissipated, SCR–1 must be turned back on. It must be noted that it is necessary to shut SCR–2 off before SCR–1 is turned back on. If this was not done, SCR–1 would detune the circuit comprising L1 and C2 and SCR–2 would not shut off. If SCR–2 could not be shut off, it would not be available to turn off SCR–1 should the need arise. As noted above, SCR–2 will be turned off by the ringing of inductor L1 and commutating capacitor C2. When SCR–2 is gated on, commutating capacitor C2 charges up to a level above the line voltage and then begins to discharge through resistor R1. The junction between resistor R1 and commutating capacitor C2 is connected to the base of transistor Q2 through a diode CR9. When commutating capacitor C2 discharges to a preset voltage, and the transient has disappeared, transistor Q2 will be turned back on and, through the action described above, SCR–1 will be gated on. This action prevents SCR–1 from being turned on before SCR–2 is capable of commutating SCR–1 off. Regardless of what occurs at the input during the discharge of commutating capacitor C2, the output will remain at zero volts. Once commutating capacitor C2 has discharged to the preset level and the transient has disappeared, SCR–1 will be gated back on and normal operation will resume. If the transient remains, SCR–1 will not be turned on. Only when the transient disappears will SCR–1 be turned on.

As previously noted, voltage sensor 20 permits satisfactory operation under capacitive load conditions. At a predetermined output voltage, a signal will appear at the output of sensor 20 which will gate transistor Q4 on thereby gating transistor Q5 off. The turning off of transistor Q5 causes, through the "OR" circuit comprising diodes CR1 and CR2, transistor Q6 to be turned off if it is in the on condition. In the manner previously described, the turning off of transistor Q6 results in the gating on of SCR–1. Accordingly, if the voltage across the load exceeds the source voltage and SCR–1 is reversed biased and shut off, as soon as the load voltage decays to a predetermined value, a gating pulse will be supplied to SCR–1 through transformer T2 to turn SCR–1 back on. The inclusion of voltage sensor 20 and the second Schmitt trigger comprising transistors Q4 and Q5 also prevents a condition which could otherwise occur if a source was connected to the present invention when no load was connected across the output terminals. Under such circumstances, if SCR–1 should in some manner be commutated off, without the presence of sensor 20, SCR–1 could not be turned back on without first disconnecting the source from the circuit.

At this point, several advantages of the present invention will be again pointed out. First, it must be noted that once SCR–1 has been turned on, except in the case of a capacitive load, the circuit of the present invention ceases to switch. Even with a capacitive load, the switching of SCR–1 back on is at a very slow rate. Thus, the generation of radio frequency interference is minimized since such interference is only generated at the instant of turning on or off of SCR–1 and not during the period when it is conducting. Under normal conditions, since everything in the circuit is at a steady state condition except when a transient occurs, no RFI is generated.

Another important advantage precipitated by the present invention results from the use of two commutating capacitors. In the prior art, a single commutating capacitor was employed. This capacitor had to be able to withstand 1.5 $v._{in}$ and thus, for an input voltage of 150 (v.), the value of the single commutating capacitor had to be 375 μfd. By breaking up the commutating capacity into two parts, the capacitor VA has been decreased by a factor of 4. In a typical circuit, this produces the following results:

PRIOR ART $$VA^2\, C.V^2 = (375)\ (225)^2 = 19 \times 10^6$$

PRESENT INVENTION $C_1 = 100$ μfd. $\qquad C_2 = 100$ μfd.

$V_{C1} = 36$(v.) $\qquad V_{C2} = 225$(v.)

$$VA^2 C_1V^2 + C_2V^2 = (100)(36)^2 + (100)(225)^2 = 5.3 \times 10^6$$

Since the size of a capacitor and also its cost is directly proportional to the VA rating, the present invention provides substantial savings from both an economic and volumetric efficiency standpoint.

Figure 3:
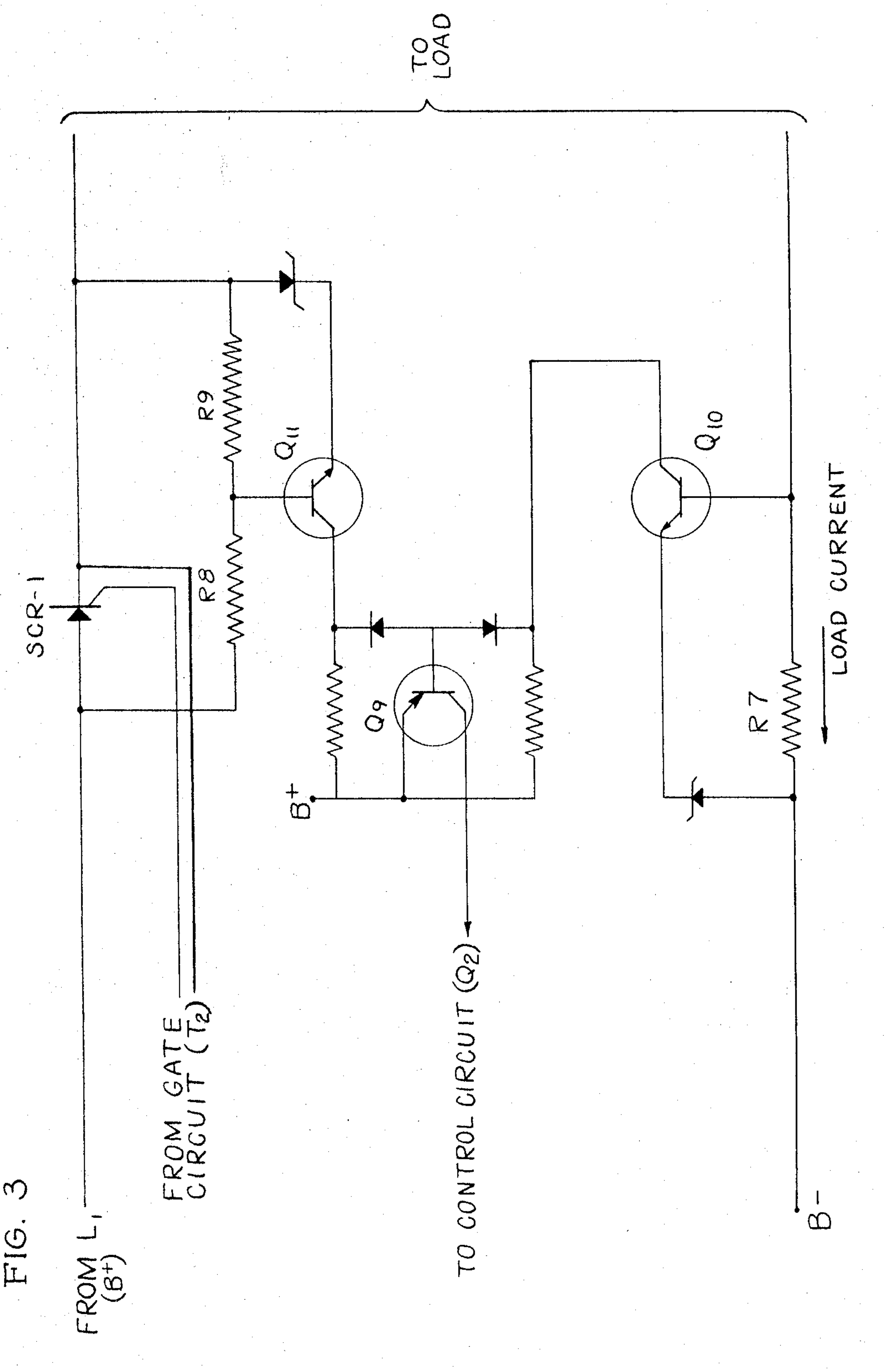
FIGURE 3 depicts a short circuit protector which may be added to the apparatus of FIGURES 1 and 2.

Referring now to FIGURE 3, a short circuit protection circuit which may be employed with the apparatus of FIGURES 1 and 2 is shown schematically. The short circuit protector is connected in parallel with the load and comprises transistors Q9, Q10, and Q11. When the load current reaches a predetermined value, indicating a short circuit condition, Q10 will be turned on by the voltage developed across resistor R7. Turning on of Q10 will result in the turning on of Q9. When Q9 turns on, Q2 (see FIGURE 2) will turn on and the circuit will react as if a transient has occurred. Thus, SCR–1 will be commutated off whenever a short circuit occurs. With SCR–1 in the off condition, if the load remains shorted, current will nevertheless flow through resistors R8 and R9. This current flow will turn transistor Q11 on and keep it on as long as SCR–1 is off and the output effectively shorted. With Q11 on, Q9 will remain on, even though the load current will be attenuated by R8 and R9 to a level which would not turn Q10 on. When the short circuit is removed, Q11 will turn off thus turning Q9 off and turning Q2 back on. As previsously explained, turning on of Q2 will deliver, via transformer T2, a pulse which will gate SCR–1 back on thereby resuming normal operation.

While a preferred embodiment of the present invention has been shown and described, various modifications and substitutions may be made thereto without departing from the spirit and scope of this invention. Accordingly, it is to be understood that the present invention has been described by way of illustration and not limitation.

What is claimed is:

1. An electronic switch adapted to be connected between a source of direct current and a load, said switch comprising:

normally conductive, force commutated, controlled rectifier means connected between a first terminal of the source and the load;

normally nonconductive, self-commutated, controlled rectifier means connected between said force commutated rectifier means and the other terminal of the source;

means for sensing a condition during the existence of which it is desired to isolate the load from the source and for generating a signal indicative of the existence of said condition; and means responsive to said condition indicative signal for gating on said normally nonconductive rectifier means whereby said normally conductive rectifier means will be commutated off.

2. The apparatus of claim 1 further comprising:

means responsive to the self-commutation of said normally nonconductive rectifier means for generating a gating signal; and means responsive to said gating signal for gating on said normally conductive rectifier means.

3. The apparatus of claim 2 wherein said switch may be employed as a transient suppressor and wherein said condition sensing means comprises:

a voltage sensor, said voltage sensor being connected in parallel with the source and on the line side of said force commutated rectifier means.

4. An electronic switch adapted to be connected between a source of direct current and a load, said switch comprising:

a normally conductive, force commutated, controlled rectifier device connected between a first terminal of the source and the load;

normally nonconductive, self-commutated, controlled rectifier means connected between said force commutated rectifier device and the other terminal of the source;

voltage sensor means connected in parallel with the source and on the line side of said force commutated rectifier device, said voltage sensor being responsive to the occurrence of undesired transients for generating control signals commensurate therewith;
means responsive to control signals provided by said voltage sensor for gating on said normally nonconductive rectifier means whereby said normally nonconductive rectifier device will be commutated off;
means responsive to the self-commutation of said normally nonconductive rectifier means for generating gating signals;
means responsive to said gating signals for gating on said normally conductive rectifier device; and
tuned circuit means including capacitive means connected in parallel with the load and on the load side of said force commutated rectifier device, said tuned circuit means filtering transients which are of insufficient magnitude or duration to cause said voltage sensor means to actuate said means for gating said normally nonconductive rectifier means.

5. The apparatus of claim 4 further comprising:
a second voltage sensor, said second voltage sensor being connected in parallel with the load on the load side of said force commutated rectifier means, said second voltage sensor providing a second gating signal when the load voltage falls below a predetermined level; and
means responsive to said second gating signal for gating said force commutated rectifier means on if it is off.

6. The apparatus of claim 5 further comprising:
means for sensing the load current and generating a signal commensurate therewith;
means responsive to said signal commensurate with load current for generating a third gating control signal when the load current exceeds a predetermined level; and
means applying said third gating control signal to said means for gating said normally nonconductive rectifier means whereby said switch will be opened when the load current exceeds the said predetermined level.

7. An electronic switch comprising:
a tapped inductor;
means for connecting a first end of said inductor to a first terminal of a source of direct current;
a first controlled rectifier device, said first rectifier device being connected in series with said inductor;
a second controlled rectifier device, said second rectifier device being connected to a tap on said inductor;
a first commutating capacitor, a first plate of said first capacitor being connected to the cathode of said first rectifier device;
a second commutating capacitor, a first plate of said second capacitor being connected to the cathode of said second rectifier device;
means for connecting second plates of said first and second capacitors to a second terminal of said direct current source; and
control means for causing either said first or second of said rectifier devices to become conductive, said control means being connected to the control electrode and cathode of each of said first and second rectifier devices, conduction of said second rectifier device causing said first rectifier device to be commutated off.

8. The apparatus of claim 7 wherein said control means comprises:
first gate means for delivering a signal to turn said first rectifier device on in response to receipt of a first gating control signal;
second gate means for delivering a signal to turn said second rectifier device on in response to receipt of a second gating control signal; and
means connected to said first and second gate means for generating said first and second gating control signals.

9. The apparatus of claim 8 wherein said first and second gate means each comprise:
means responsive to gating control signals for generating a voltage pulse; and
means for applying the thus generated voltage pulse between the cathode and control electrode of the associated rectifier device.

10. The apparatus of claim 9 wherein said means for generating gating control signals comprises:
voltage sensor means connected between said means for connecting the inductor to the source and the means for connecting the commutating capacitor second plates to the source, said voltage sensor providing a signal commensurate with the source voltage;
control signal generating means responsive to said signal commensurate with source voltage for generating a first gating control signal when the source voltage exceeds a predetermined level, said first gating control signal being delivered to said second gate means to turn said second controlled rectifier device on; and
means connected to the cathode of said second controlled rectifier device for delivering said signal indicative of commutation of said second rectifier device to said control signal generating means whereby said control signal generating means will generate a second gating control signal when the second rectifier device is commutated off, said second gating control signal being delivered to said first gate means to turn said first controlled rectifier back on.

11. The apparatus of claim 10 wherein said control signal generating means comprises:
a bistable trigger circuit, said trigger circuit having the output of said voltage sensor and said signal indicative of commutation applied as inputs thereto, said trigger circuit providing a pair of output signals;
means for delivering a first of said trigger circuit output signals to the pulse generating means of said first gate means; and
means for delivering the second of said trigger circuit output signals to the pulse generating means of said second gate means.

12. The apparatus of claim 11 wherein said pulse generating means of each of said gate means each comprise:
a transistor amplifier;
a transformer, the primary winding of said transformer being connected in series with said amplifier, the ends of the secondary winding of said amplifier being respectively connected to the cathode and control electrode of the associated rectifier device; and
pulse shaping means being connected between said trigger circuit output and the input to said amplifier, said amplifier causing current to flow through said transformer primary winding only when said trigger circuit switches from one state to another.

13. The apparatus of claim 12 wherein said controlled rectifier devices each comprise:
a silicon controlled rectifier.

14. The apparatus of claim 13 further comprising:
means for sensing the current being delivered to the load and for generating a signal commensurate therewith;
a normally nonconductive transistor amplifier,
means responsive to said signal commensurate with load current for gating on said normally nonconductive amplifier;
means connecting the output terminal of said amplifier to said trigger circuit input whereby the conduction of said amplifier in response to excessive load current will cause said trigger circuit to generate a signal which will gate said second rectifier device on thus turning said first rectifier device off;

means connected in paralled with said first rectifier device for allowing load current to bypass said first rectifier device when it is in the off condition;

means for generating a signal commensurate with the current through said bypass device; and means responsive to said signal commensurate with current through the bypass device for maintaining said amplifier in the on condition when the load current has decreased below the level at which said means responsive to said signal commensurate with load will provide a gating signal.

References Cited

UNITED STATES PATENTS

| | | | |
|---|---|---|---|
| 3,174,096 | 3/1965 | Lichowsky | 321—45 X |
| 3,238,418 | 3/1966 | Heft | 317—33 |
| 3,363,164 | 1/1968 | Watson et al. | 321—21 X |
| 3,369,154 | 2/1968 | Swain | 317—33 |

JOHN F. COUCH, *Primary Examiner.*

R. V. LUPO, *Assistant Examiner.*

U.S. Cl. X.R.

317—33, 50; 321—45